(12) United States Patent
Noto et al.

(10) Patent No.: US 10,307,679 B2
(45) Date of Patent: Jun. 4, 2019

(54) NON TRANSITORY COMPUTER-READABLE STORAGE MEDIUM AND METHOD OF CONTROLLING A COMPUTER

(71) Applicant: CAPCOM CO., LTD., Osaka (JP)

(72) Inventors: Yuki Noto, Osaka (JP); Koshi Watamura, Osaka (JP)

(73) Assignee: CAPCOM CO., LTD., Chuo-Ku, Osaka (JP)

(*) Notice: Subject to any disclaimer, the term of this patent is extended or adjusted under 35 U.S.C. 154(b) by 145 days.

(21) Appl. No.: 15/440,530

(22) Filed: Feb. 23, 2017

(65) Prior Publication Data
US 2017/0239574 A1    Aug. 24, 2017

(30) Foreign Application Priority Data

Feb. 24, 2016  (JP) ................................ 2016-032750

(51) Int. Cl.
| | |
|---|---|
| *A63F 13/25* | (2014.01) |
| *A63F 13/57* | (2014.01) |
| *G06T 13/60* | (2011.01) |
| *G06T 17/20* | (2006.01) |
| *G06T 19/20* | (2011.01) |
| *A63F 13/525* | (2014.01) |

(52) U.S. Cl.
CPC .............. *A63F 13/57* (2014.09); *A63F 13/25* (2014.09); *A63F 13/525* (2014.09); *G06T 13/60* (2013.01); *G06T 17/205* (2013.01); *G06T 19/20* (2013.01); *G06T 2210/24* (2013.01)

(58) Field of Classification Search
CPC ..... G06T 2210/24; G06T 13/20; G06T 13/60; G06T 17/205; G06T 19/20; A63F 13/57; A63F 13/25; A63F 13/525
See application file for complete search history.

(56) References Cited

U.S. PATENT DOCUMENTS 5,245,320 A  *  9/1993  Bouton ................... A63F 13/06
                                                       273/148 B
8,054,311 B1 * 11/2011  Sheffler .................. G06T 13/40
                                                         345/419
(Continued)

OTHER PUBLICATIONS

Autodesk Maya 2016 Help "Converting fluids to polygons", [online] Jan. 13, 2016, <http://help.autodesk.com/view/MAYAUL/2016/JPN/?guid=GUID-E509F8B9-2E27-40F8-ABD5-5530CC4F0909>.

*Primary Examiner* — David L Lewis
*Assistant Examiner* — Robert E Mosser
(74) *Attorney, Agent, or Firm* — IP Business Solutions, LLC

(57) ABSTRACT

The present invention causes a computer to function as a virtual space generating unit, a game screen displaying unit and a fluid displaying unit.
A fluid displaying unit displays pseudo three-dimensional representation of fluid in virtual space on a game screen. And the fluid displaying includes a model setting unit, a polygon mesh setting unit and a fluid setting unit. The model setting unit sets a predetermined linear model on the virtual space and moves a basis portion of the linear model to a predetermined direction, and moves the linear model to follow virtual points which are shot from the basis portion at intervals and which move to follow a predetermined track including the basis portion as a starting point.

5 Claims, 7 Drawing Sheets

(56) References Cited

U.S. PATENT DOCUMENTS

| | | | | |
|---|---|---|---|---|
| 8,922,553 B1* | 12/2014 | Tena | ................. | G06T 17/00 345/419 |
| 2004/0181382 A1* | 9/2004 | Hu | ................. | G06T 13/60 703/9 |
| 2008/0177519 A1* | 7/2008 | Miller | ................. | G06T 13/60 703/9 |

* cited by examiner

NON TRANSITORY COMPUTER-READABLE STORAGE MEDIUM AND METHOD OF CONTROLLING A COMPUTER

TECHNICAL FIELD

This invention relates to a non-transitory computer readable storage medium storing a game program and a controlling method of the game.

BACKGROUND OF THE INVENTION

Video games such as action games and role-playing games make characters act in a three-dimensional virtual game space corresponding to operation input by users. Various three-dimensional objects are located in the three-dimensional virtual game space and they are generated by computer graphics.

Flowing of a fluid such as smoke and water may be shown by using polygon meshes in the three-dimensional virtual game space (for example Non-patent literature 1). A texture on the polygon meshes becomes deformed by deforming the polygon meshes, so that the fluid is artificially shown.

Non-patent literature 1: AUTODESK MAYA 2016 HELP "Converting fluids to polygons", [online] Jan. 13, 2016, <http://help.autodesk.com/view/MAYAUL/2016/JPN/?guid=GUID-E509F8B9-2E27-40F8-ABD5-5530CC4F0909>

SUMMARY OF THE INVENTION

Technical Problem

However, the flowing of the fluid shown by using the polygon meshes is not smooth.

The present invention has an object to provide a storage medium and a controlling method of the game that can show the realistic fluid in the game with the three-dimensional virtual space.

The present invention causes a computer to function as a virtual space generating unit, a game screen displaying unit, and a fluid displaying unit. The fluid displaying unit includes a model setting unit, a polygon mesh setting unit, and a fluid setting unit. The model setting unit sets a predetermined linear model on the virtual space and moving a basis portion of the linear model to a predetermined direction, and moves the linear model to follow virtual points which are shot from the basis portion at intervals and which move to follow a predetermined track including the basis portion as a starting point. The polygon mesh setting unit sets a polygon mesh around the linear model and deforms the polygon mesh based on the movement of the linear model. The fluid setting unit displays the fluid flowing from the basis portion to an edge of the linear model on the polygon mesh.

The fluid setting unit may choose the one fluid from the multiple fluids based on the movement of the linear model and displays the fluid.

The linear model may include joints and at least one connecting object which connects between contiguous joints, and the model setting unit may deform the linear model to follow the virtual points by bending the joints.

The model setting unit may move the linear model to follow the virtual points by limiting moving speeds of the joints so that the joint near the edge of two joints connected with each other is slower than the joint near the basis portion of the two joints connected with each other.

A method of controlling a computer according to the present invention includes a virtual space generating step for generating a three-dimensional virtual space, a game screen displaying step for displaying an image as a game screen taken by a virtual camera located in the virtual space, and a fluid displaying step for displaying pseudo three-dimensional representation of fluid in virtual space on the game screen. The fluid displaying unit includes a model setting step for setting a predetermined linear model on the virtual space and moving a basis portion of the linear model to a predetermined direction and for moving the linear model to follow virtual points which are shot from the basis portion at intervals and which move to follow a predetermined track including the basis portion as a starting point, a polygon mesh setting step for setting a polygon mesh around the linear model and deforming the polygon mesh based on the movement of the linear model, and a fluid setting step for displaying the fluid flowing from the basis portion to an edge of the linear model on the polygon mesh.

Advantages of the Invention

According to the present invention, a storage medium and a controlling method of the game that can show the realistic fluid in the game with the three-dimensional virtual space are provided.

DESCRIPTION OF EMBODIMENT

Hereinafter, a non-transitory computer-readable storage medium and a method for controlling a game according to embodiments of the present invention will be described with reference to the drawings.

Summary of the Game

The following is an example of an action game executed on a home game console device. The action game according to one embodiment generates a three-dimensional virtual game space. A user operates a player character acting in the virtual game space. The player character fights with enemy characters for the predetermined purpose such as killing off the enemy characters or arriving at a predetermined position in the virtual game space.

Hardware Configuration

The game device 2 executing the game is described. The game system according to the one embodiment includes the game device 2 and external devices such as a monitor (display unit) 19, a speaker 22, and a controller (manipulation unit) 24 which are connected to the game device 2. The game system can execute the game based on a game program 30A and game data 30B loaded from a disk-typed storage medium 30. Hereinafter, the game system is simply described as the game device 2 in some cases.

Figure 1:
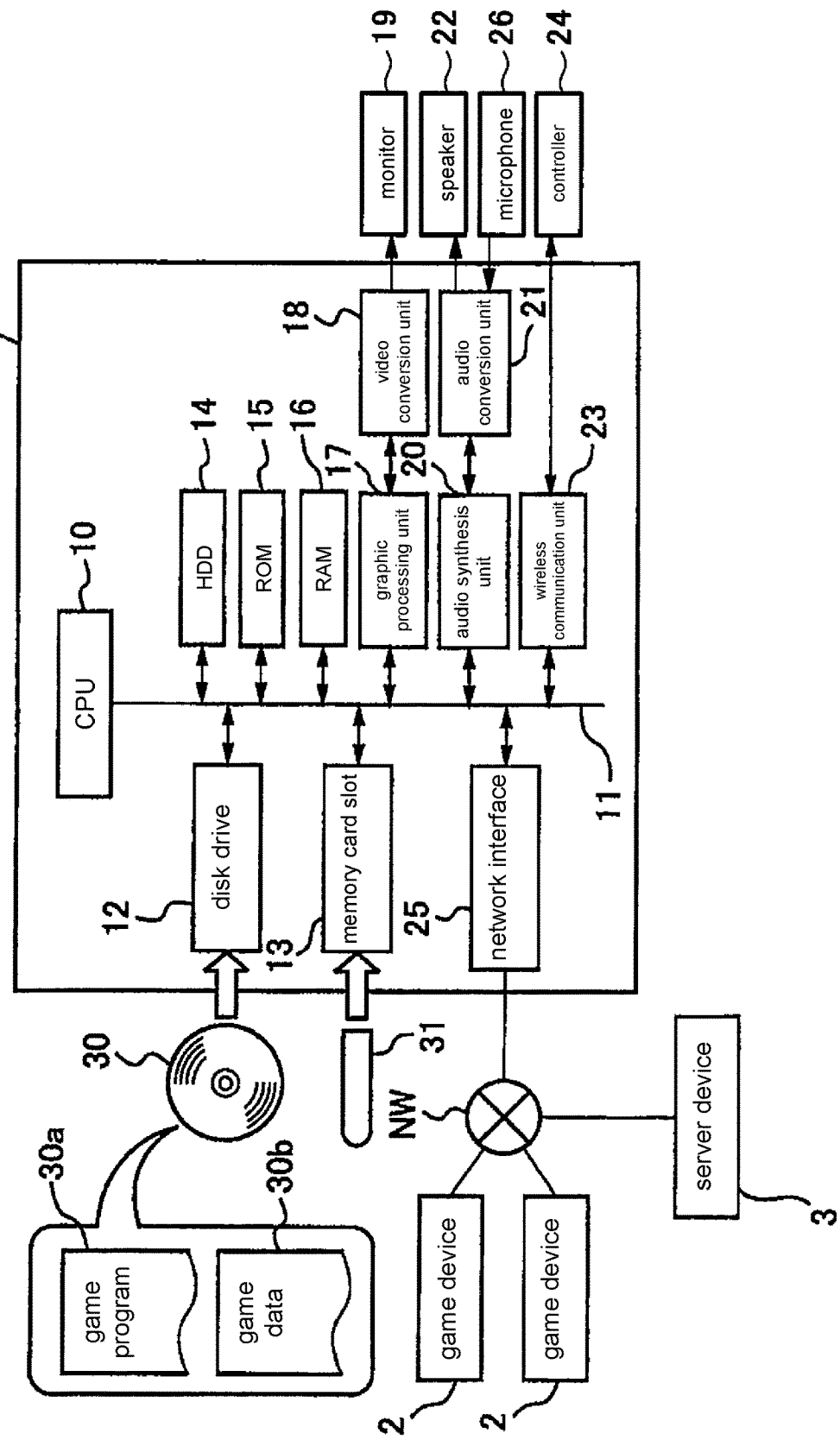
FIG. 1 is a block diagram showing a configuration of hardware in a game device according to one embodiment of the present invention.

FIG. 1 is a block diagram showing a configuration of hardware in the game device 2 according to one embodiment. As shown in FIG. 1, the game device 2 can communicate to other game devices 2 and a server 3 in both ways via a communication network NW such as the Internet or a local area network (LAN). The game device 2 has a central processing unit (CPU) 10 for controlling the game device 2. The CPU 10 is connected to a disk drive 12, a memory card slot 13, a hard disk drive (HDD) 14 for storing a program, a read only memory (ROM) 15, and a random access memory (RAM) 16 via a bus 11.

Also, the CPU 10 is connected to a graphic processing unit 17, an audio composition unit 20, a wireless communication unit 23, and a network interface 25 via the bus 11.

The graphic processing unit 17 draws a game image including the virtual game space and characters in response to instructions from the CPU 10. The graphic processing unit 17 is connected to an external monitor 19 via the video conversion unit 18. The game image drawn by the graphic processing unit 17 is converted to a video format, and the video is displayed on the monitor 19.

The audio synthesis unit 20 plays and synthesizes digital game sounds in response to instructions from the CPU 10. The audio synthesis unit 20 is connected to an external speaker 22 via an audio conversion unit 21. Therefore, the game sounds played and synthesized by the audio synthesis unit 20 are decoded to an analog format by the audio conversion unit 21, and are output to outside from the speaker 22.

The audio conversion unit 21 encodes user's voices input from a headset connected to the game device 2 or a microphone 26 embedded in the controller 24 into digital format data. The audio synthesis unit 20 can acquire the digital format data and can send acquired data to the CPU 10 as input data.

The wireless communication unit 23 has a 2.4 GHz band wireless communication module. The wireless communication unit 23 is connected to the controller 24 wirelessly, and can send and receive data. The user inputs signals into the game device 2 by manipulating control elements such as buttons on the controller 24 and can control an action of the player character displayed in the monitor 19. Also, the network interface 25 connects the game device 2 to communication network NW such as the Internet or LAN. The game device can communicate with other game devices 2 or the server 3. The game device 2 is connected to other game devices 2 via the communication network NW. Each of the game devices 2 sends and receives data. Each of the game devices 2 can display multiple player characters in the same virtual game space in synchronization. Therefore a multi-play, in which multiple player characters corresponding to multiple users fight with enemy characters together or fight with other player characters, is executable.

(Functional Configuration of the Game Device)

Figure 2:
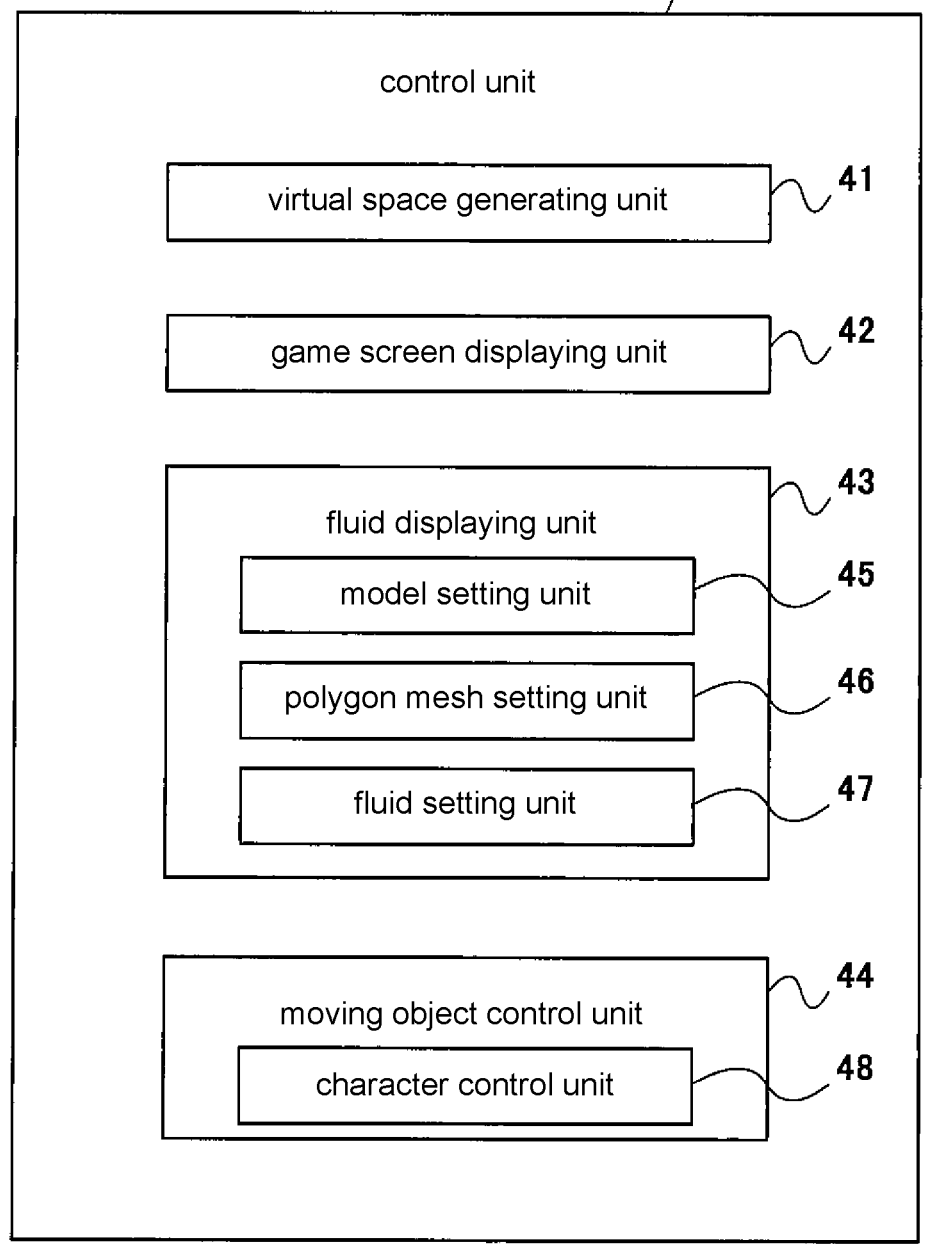
FIG. 2 is a block diagram showing a functional configuration of the game device shown in FIG. 1.

FIG. 2 is a block diagram showing a functional configuration of the game device shown in FIG. 1. The game device 2 operates as a computer including a control unit 4 including the CPU 10, the HDD 14, the ROM 15, the RAM 16, the graphic processing unit 17, the video conversion unit 18, the audio synthesis unit 20, the audio conversion unit 21, the network interface 25, and the like. As shown in FIG. 2, the control unit 4 of the game device 2 operates as a virtual space generating unit 41, a game screen displaying unit 42, a fluid displaying unit 43, and a moving object control unit 44 by executing the game program 30A. The fluid displaying unit 43 includes a model setting unit 45, a polygon mesh setting unit 46, and a fluid setting unit 47. The moving object control unit 44 includes a character control unit 48.

The virtual space generating unit 41 generates a third-dimensional virtual space. The virtual space is a game space in which the player character operated by the user acts. The virtual space generating unit 41 generates fixed objects located in the virtual space and/or moving objects such as player characters moving in the virtual space. For example, the virtual space generating unit 41 loads data about objects, textures, and so on included in game data 30B, and arranges them in the three-dimensional virtual space, in response to the moving player character.

Figure 3:
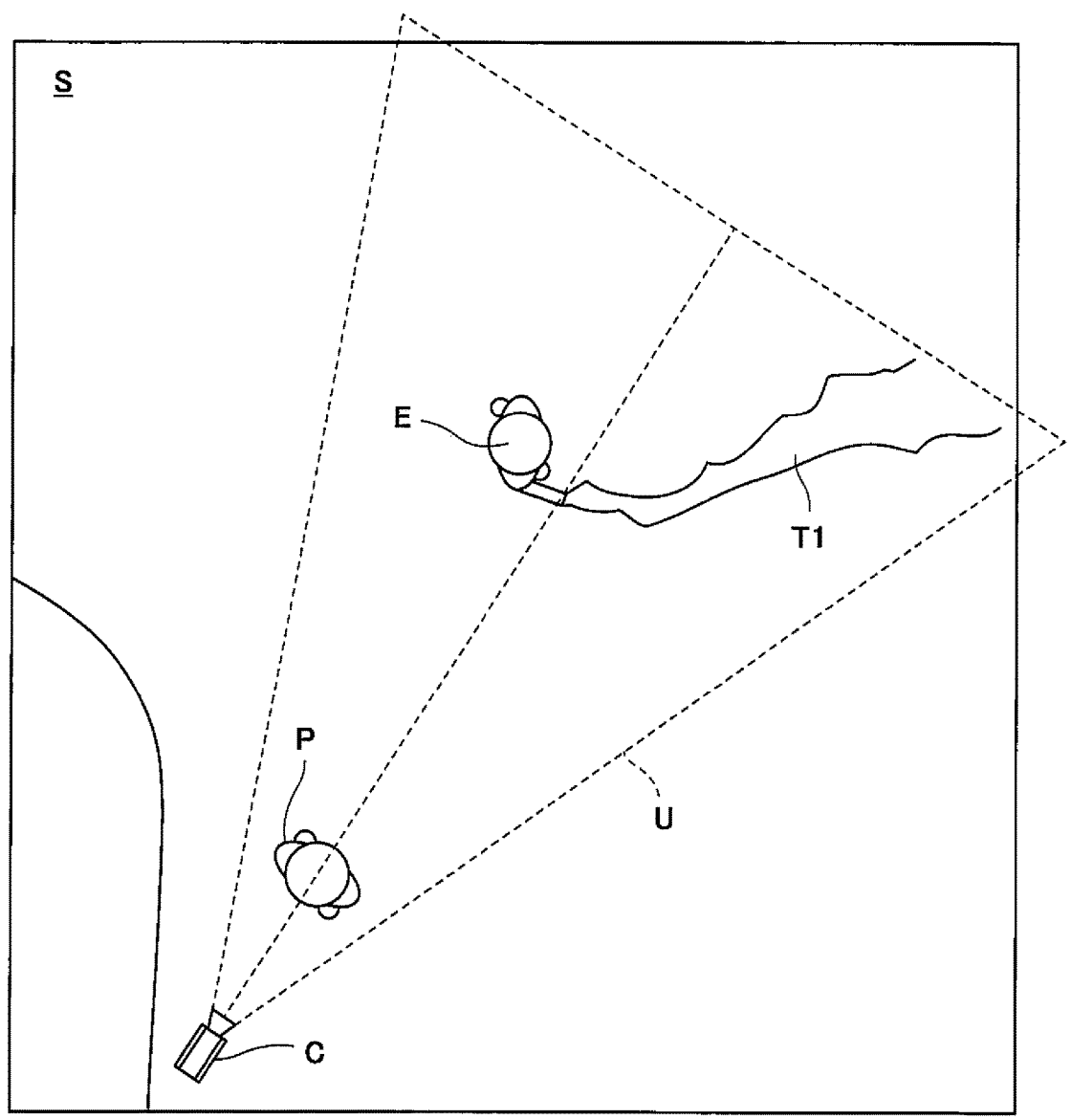
FIG. 3 is a plane view showing a three-dimensional virtual space according to one embodiment of the present invention.
Figure 4:
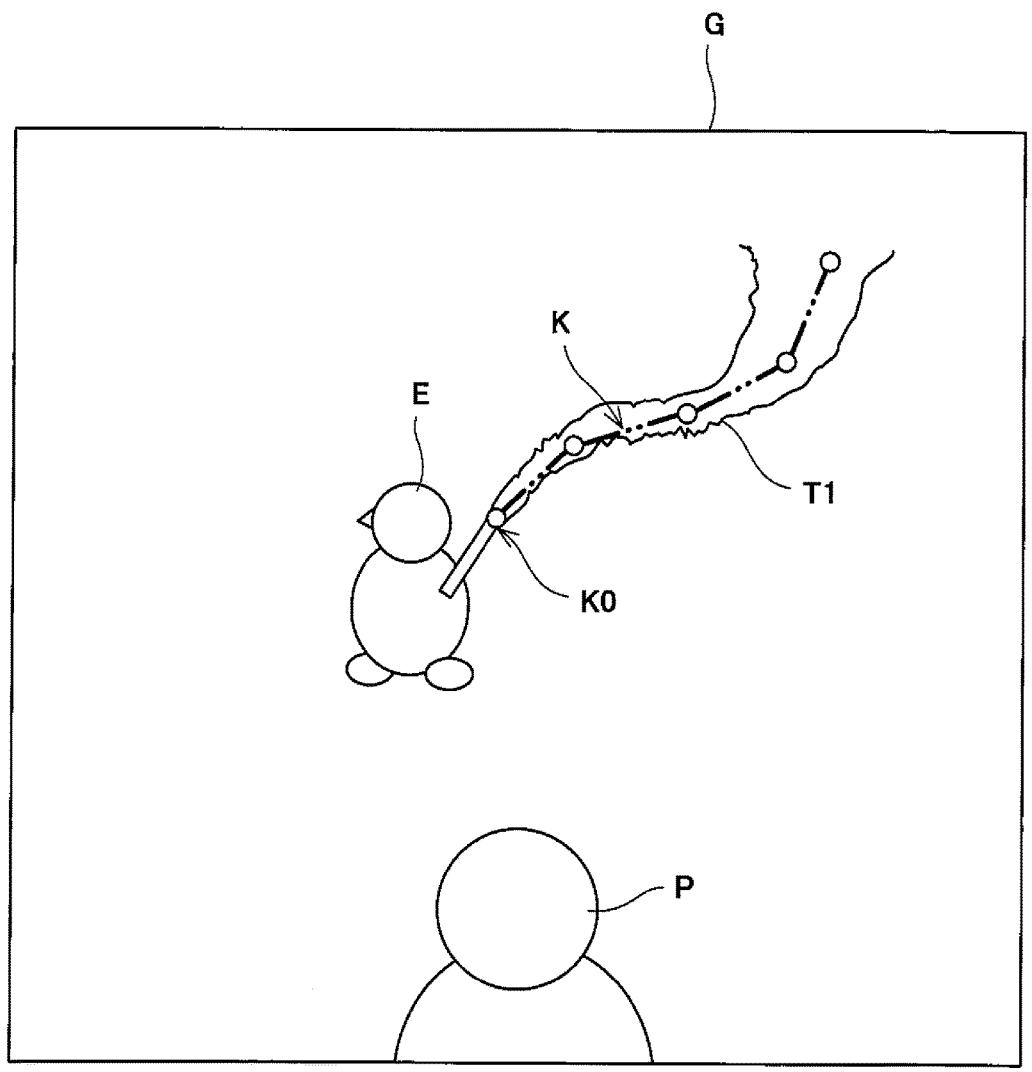
FIG. 4 is a view showing a game screen according to one embodiment of the present invention.

FIG. 3 is a plane view showing a three-dimensional virtual space in the present embodiment. FIG. 4 is a view showing a game screen in the present embodiment. As shown in FIG. 3, in the three-dimensional virtual space S, various objects, a virtual camera C, and a light source L are arranged on a landform drawn with polygons, textures, and so on. In the example of FIG. 3, a player character P operable by the user via the controller 24 and a non-player character E operated by the computer are located in the virtual space S as moving objects.

The moving object control unit 44 controls actions of the moving objects P and E. The moving object control unit 44 functions as the character control unit 48, and controls actions of the player character corresponding to the user who operates the computer in response to operation input of the controller 24 by the user or a progress status of the game. The moving object includes a movable character other than the player character P or a movable object. The moving objects include movable objects other than the player character P and the non-player object E. For example, the moving objects include vehicles such as cars and airplanes, flying objects such as balls, bombs, bullets and arrows, animals, and fixed objects such as furniture that is spattered by burst. The moving object control unit 44 also controls these moving objects.

The game screen displaying unit 42 displays images that are taken by the virtual camera C located in the virtual space S as a game screen G (FIG. 4) on the monitor 19. The moving objects P, E, and a fluid T1 (described later) included in a shooting range U of the virtual camera C are displayed on the game screen G.

The fluid displaying unit 43 displays pseudo three-dimensional representation of the fluid T1 in the virtual space S. In the present embodiment, as shown in FIG. 4, the fluid T1 is long smoke coming from a stick which the non-player character E holds. The fluid is not limited to this. For example, gas such as flame, smoke, and vapor or particles floating in the gas, or liquid such as water and blood may be applicable.

Figure 5:
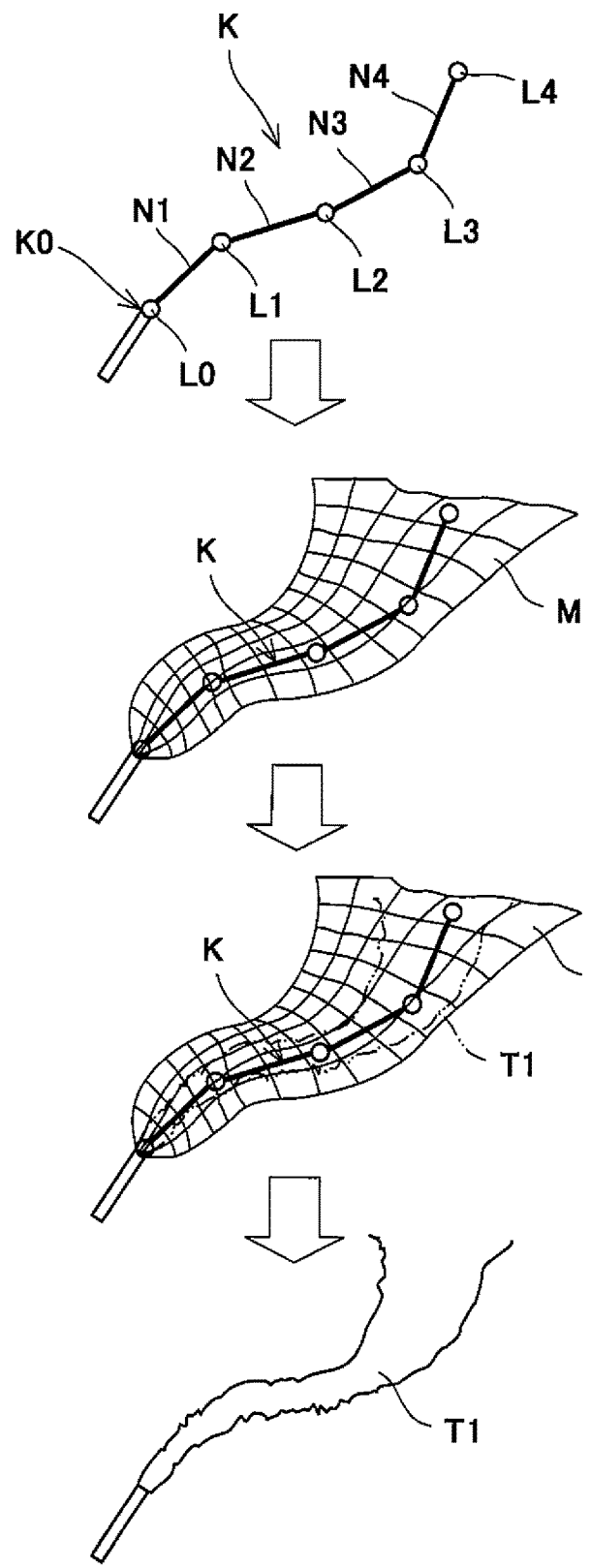
FIG. 5 is a view showing a configuration of fluid according to one embodiment of the present invention.

FIG. 5 is a view showing a configuration of the fluid T1 according to one embodiment of the present invention. In the embodiment, a fluid object includes a linear model K, a polygon mesh M, and fluid T1 displayed on the polygon mesh M by an animation. The linear model K has movable joints L0-L4 (hereinafter called joint L), and the joints L0-L4 are connected sequentially. In FIG. 5, there are connecting objects N1-N4 (hereinafter called connecting object N) between the contiguous joints. The linear model K becomes deformed by bending of joints L0-L4. In the embodiment, the number of the joints L is five; however, the number of the joints may be two, three, four, or six and more. For example, the number of the joints L may range from five to ten for showing long smoke.

The polygon mesh M is set around the linear model K. The fluid T1 is shown on the surface of the polygon mesh M by using the two-dimensional data (texture image, video or two-dimensional simulation data) of the fluid T1. Therefore, the fluid T1 is three-dimensionally displayed via the polygon mesh M. The linear model K and polygon mesh M are not displayed on the game screen (they are transparent). Actually, the fluid T1 on the polygon mesh M is only displayed on the game screen G. In FIG. 4, the linear model K is displayed in order to show that the fluid T1 is based on the linear model K.

The fluid display unit 43 displays the fluid T1 three-dimensionally by using the fluid object described above. The model setting unit 45 set the linear model K in the virtual space S. The polygon mesh setting unit 46 sets the polygon mesh M around the linear model K so that the polygon mesh M becomes deformed by bending the linear model K. For example, the position on the cross section of the polygon mesh M perpendicular to the connecting object N of the linear model K is based on the position of the linear model K. The polygon mesh setting unit 46 changes the position of the polygon mesh M in response to the change of each position on the linear model K. The fluid setting unit 47 displays the fluid T on the polygon mesh M.

Virtual points xi (i=0, 1, 2, and more) are shot at intervals from a basis portion K0 (where the joint L0 is fixed) of the linear model K and move along a predetermined track Qi (i=0, 1, 2, and more). The model setting unit 45 moves the basis portion K0 to a predetermined direction and moves the linear model K to follow the virtual points. The predetermined track Qi is a basis position of the joints L0-L4 when the basis portion K0 has been static.

If the basis portion K0 is set on a moving object (for example non-player character), the basis portion K0 moves with the moving object. Also, an external factor (like wind) in the virtual space S causes the basis portion K0 to move. Also the basis portion K0 may move like a vibration regardless of the action of the object on which the basis portion is set. The basis portion K0 like this may move all the time while the basis portion is displayed on the game screen or start moving in response to a predetermined trigger. The predetermined trigger may be a case of pressing a predetermined switch, a case of hitting an attack to a target object, and so on.

Figure 6:
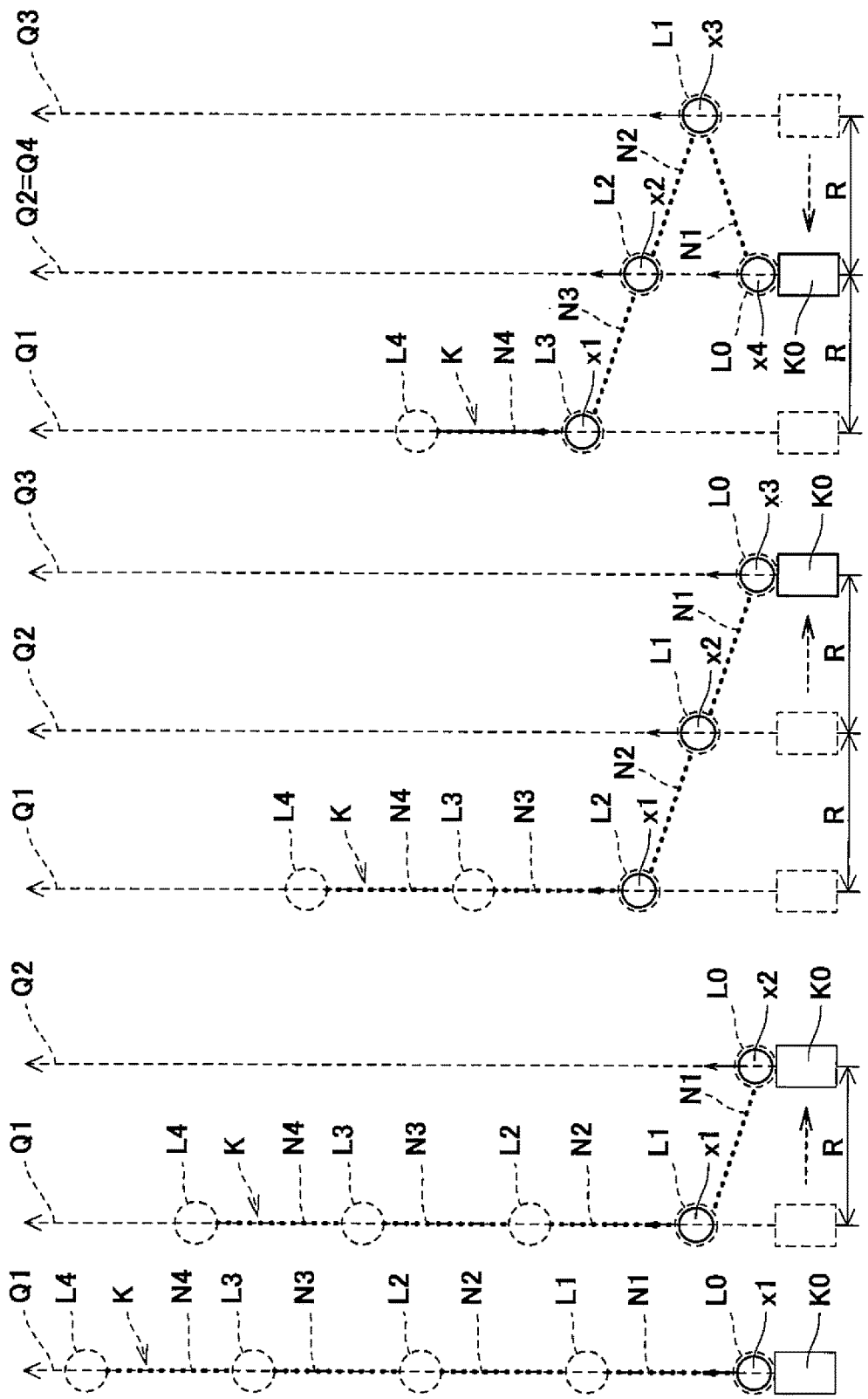
FIGS. 6A, 6B, 6C, and 6D are views showing movement of a linear model according to one embodiment of the present invention.
Figure 7:
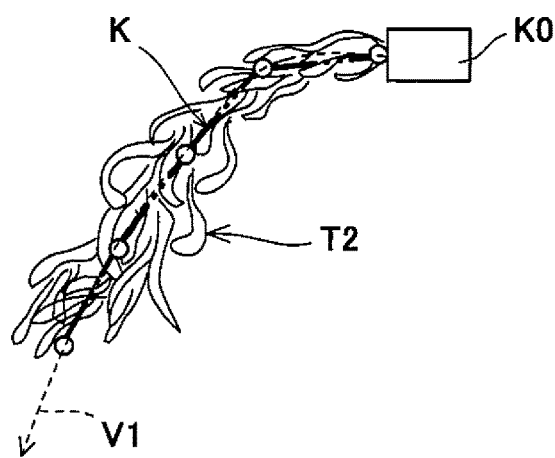
FIGS. 7A, 7B and 7C are views showing a fluid according to another embodiment of the present invention.
Figure 7:
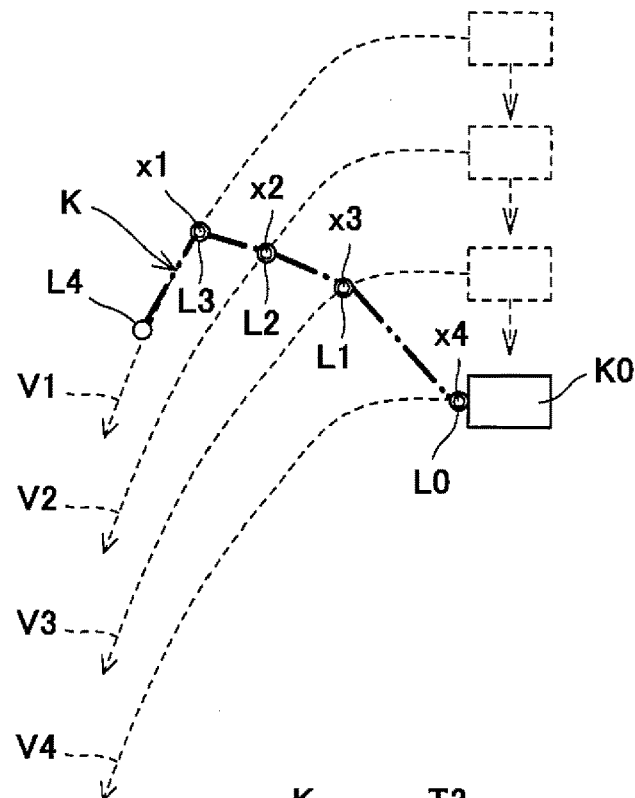
Figure 7:
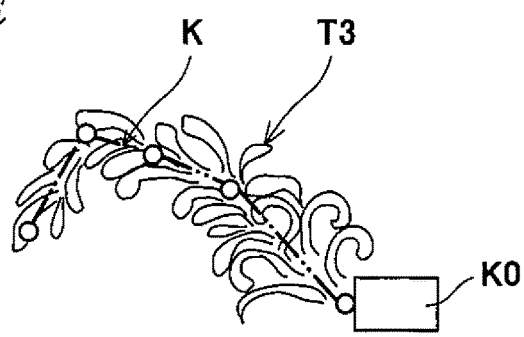

In the case of long smoke, that is the fluid T1, occurring from an edge of the stick which the non-player character E is holding as shown in FIG. 4, the stick itself may be the basis portion K0. The basis portion K0 may move when the stick moves in response to the action of the non-player character E. Also, the basis portion K0 may be set independently of the object on which the basis portion K0 is set. For example, in the example of FIG. 4, the basis portion K0 may move regardless of whether the stick moves or not. In this case, the basis portion K0 can move within a predetermined range based on the edge of the stick. The basis portion K0 is not displayed on the game screen G (it is transparent). In FIG. 6 and FIG. 7, the basis portion K0 is displayed as a box object. However, described above, the basis portion K0 may be not displayed on the game screen G.

FIGS. 6A, 6B, 6C, and 6D are views showing movement of a linear model of the present embodiment. FIG. 6A shows the linear model K at a time t1. FIG. 6B shows the linear model K at a time t2 after the time t1. FIG. 6C shows the linear model K at a time t3 after the time t2. FIG. 6D shows the linear model K at a time t4 after the time t3. The track Qi of the virtual point xi is line in the embodiment. The basis portion K0 of the linear model K is static before t1. The basis portion K0 moves to a direction perpendicular to the track Qi (in FIG. 6, right) during the period from the time t1 to the time t3. The basis portion K0 moves to an opposite direction (in FIG. 6, left) during the period from the time t3 to the time t4. In the example, an interval of each times is certain and the basis portion K0 moves at a constant speed.

Because the basis portion K0 of the linear model K is static before t1, the joints L0-L4 of the linear model K are directly aligned (along the track Q1). As shown in FIG. 6A, the virtual point x1 is shot from the basis portion K0 and move along the track Q1 at the time t1. The linear model K does not change at this time. The basis portion K0 moves to the right during the period from the time t1 to the time t2. The track Q1 is fixed on the position at the time t1 when the virtual point x1 occurred. The virtual point x1 moves along the original track Q1 regardless of the movement of the basis portion K0.

As shown in FIG. 6B, the virtual point x2 is shot from the basis portion K0 and move along the track Q2 at the time t2. The track Q2 is set based on the basis portion K0 at the time t2. The track Q2 is shifted in parallel from the Q1 to the right by a distance R. As a result, the linear model K becomes deformed to include the virtual positions x1 and x2. As shown in FIG. 6B, the linear model K becomes deformed, so that the joint L0 is located in the virtual point x2, and the joint L1 is located in the virtual point x1, and the joints L2-L4 are along the track Q1.

The basis portion K0 moves to the right during the period from the time t2 to the time t3. The track Q2 is fixed on the position at the time t2 when the virtual point x2 is shot. The virtual point x2 moves along the original track Q2 regardless of the movement of the basis portion K0. As shown in FIG. 6C, the virtual point x3 is shot from the basis portion K0 and move along the track Q3 at the time t3. The track Q3 is set based on the basis portion K0 at the time t3. The track Q3 is shifted in parallel from the Q2 to the right by a distance R. As a result, the linear model K becomes deformed to include the virtual positions x1, x2, and x3. As shown in FIG. 6C, the linear model K becomes deformed, so that the joint L0 is located in the virtual point x3, and the joint L1 is located in the virtual point x2, and the joint L2 is located in the virtual point x1, and the joints L3 and L4 are along the track Q1.

The basis portion K0 moves to the left during the period from the time t3 to the time t4. The track Q3 is fixed on the position at the time t3 when the virtual point x3 is shot. The virtual point x3 moves along the original track Q3 regardless of the movement of the basis portion K0. As shown in FIG. 6D, the virtual point x4 is shot from the basis portion K0 and move along the track Q4 at the time t4. The track Q4 is set based on the basis portion K0 at the time t4. The track Q4 is shifted in parallel from the Q3 to the right by the distance R. The track Q4 equals the track Q2 in the example. As a result, the linear model K becomes deformed a form including the virtual positions x1, x2, x3, and x4. As shown in FIG. 6D, the linear model K becomes deformed, so that the joint L0 is located in the virtual point x4, and the joint L1 is located in the virtual point x3, and the joint L2 is located in the virtual point x2, and the joint L3 is located in the virtual point x1, and the joint L4 is along the track Q1. In the following process, similarly the linear model K becomes deformed, so that the linear model K follows the virtual point xi which occurs from the basis portion K0 and moves along the track Q1.

When the linear model K becomes deformed to follow the virtual point xi described above, a tension between the two joints connected to each other is ignored. For example, even if the joint L0 moves, the tension by the movement of the joint L0 does not influence the movement of the joint L1. As shown in FIG. 6, a distance between the two joints connected to each other may be fixed. On the other hand, as shown in FIG. 7, the distance between the two joints connected to each other may change.

For realizing the linear model K described above, the model setting unit 45 limits a speed of the joints L0-L4 so that the joint near the edge (the joint L4) is slower than the joint near the basis portion.

For example, in the example of FIG. 6, the joint L0 moves by a distance 2R and the joint L1 moves by a distance R during the period from the time t1 to the time t3. Therefore, the speed (R/T) of the joint L1 to the right is slower than the speed (2R/T) of the joint L0 to the right. When the basis portion K0 moves to the right, the model setting unit 45 limits a speed of the joints so that the joint L1 near the edge is slower than the joint L0 near the basis portion K0. Also, the model setting unit 45 limits a speed of the joints so that the joint L2 is slower than the joint L1 and the joint L3 is slower than the joint L2, and the joint L4 is slower than the joint L3. It is possible to realize an action of the linear model K for a realistic three-dimensional displaying in this way. Also a skinning process may be executed against the linear model K for smooth moving.

Described above, the fluid setting unit 47 displays the fluid T1 flowing from the basis portion K0 to the edge (joint L4) by using the linear model K which becomes deformed to follow the virtual point xi. The fluid T1 is shown by a video displayed on a two-dimensional image on the polygon mesh M. For example, the video includes a sequential animation, which displays texture images sequentially on the polygon mesh M, a movie texture, which displays prepared video data on the polygon mesh M, and two-dimensional simulation of the fluid.

Described above, the polygon mesh M which displays the fluid T becomes deformed based on the linear model K. The linear model K becomes deformed to follow the virtual points xi which move along the predetermined track Qi, and therefore, the moving of the joints L0-L4 do not affect each other. It is possible to smooth an action of the linear model for a three-dimensional displaying of the fluid in this way. And it is possible to show the fluid T1 with a realistic three-dimensional displaying on the polygon mesh M.

Another Example

The track Qi of the virtual point xi which is the basis of the movement of the linear model K may be a line, a curve, or a broken line. FIGS. 7A, 7B, and 7C are views showing a fluid of another present embodiment. FIG. 7A shows a fluid T2 having the linear model K moves along a curved track V1. FIG. 7B shows that the linear model K in FIG. 7A becomes deformed. FIG. 7C shows a fluid T3 having the linear model K which became deformed in FIG. 7B. Described above, the linear model K is not displayed on the game screen G (it is transparent). However, it is explicitly shown for comprehension of the relationship with the fluids T2 and T3 in FIG. 7A and FIG. 7C.

In the embodiment, water as the fluids T2 and T3 is ejected from a fixed object (not shown) located in the virtual space S and the water run down naturally (like a waterfall). The virtual point xi is shot horizontally from the basis portion K0 and moves along the curved track V1. As shown in FIG. 7A, when the basis portion K0 has been static, the linear model K becomes curved downward like tracing an arc. The fluid T2 falls like tracing an arc from the basis portion K0, and is displayed on the polygon mesh M (not shown in FIGS. 7A, 7B, and 7C) as the water (by an animation). For emphasizing the flow of the water, the fluid T2 is shown as the water which spouts and spread to the edge (the joint L4) of the linear model K.

As shown in FIG. 7B, when the basis portion K0 has moved downward, the virtual points x1-x4 move along the track V1-V4 based on the position of the basis portion K0. The linear model K becomes deformed so that the edge (the joint L4) is on the upper side against the basis portion K0. As a result, as shown in FIG. 7C, the fluid T3 displayed on the polygon mesh M is shown as the water which spouts from the basis portion K0 and falls naturally. In this case, the fluid T3 is shown as the flow of the water, width of which becomes thinner as approaching the edge (the joint L4) of the linear model K because a part of water comes back by gravity.

In the example, the multiple (two) fluids T2 and T3 (multiple videos) are selectively used for showing water. In other words, the fluid displaying unit 47 chooses the one fluid from the multiple fluids (T2 and T3) based on the movement of the linear model K. Thereby, it is possible to show the realistic three-dimensional fluid even if the linear model K changes any form. In the example, the two fluids (T2 and T3) are used. Alternatively more than two fluids may be selectively used. The multiple videos may be texture images which are a part of an animation and/or the multiple videos have a display sequence of the texture images which are different from each other. Also, an animation speed of the multiple videos may be different from each other.

Another Example

The present invention may be improved, changed, and modified without departing from the broader idea and scope of the invention and not intended to be limited to the particular embodiments (forms) disclosed above.

In the above embodiment, the initial velocity of the virtual point xi is shot from the basis portion K0 of the linear model K remains constant. However, the initial velocity of the virtual point xi may be change based on the position of the basis portion K0, moving direction, and moving speed. In this case, the tracks Qi and Vi of the virtual point xi may be change based on the initial velocity of the virtual point xi. In addition to this or alternatively, the moving speed (limiting speed) of the joints L1-L4 may be changed based on the initial velocity of the virtual point xi. Because the tracks Qi and Vi and/or the joint L1-L4 may be changed based on the initial velocity of the virtual point xi, the linear model K may be changed based on the initial velocity of the virtual point xi. Thereby, it is possible to show the fluid which changes shape based on the strength of the flow.

The virtual point xi may move up as shown in FIGS. 3-6 or move down as shown in FIG. 7. The virtual point xi which moves up is applicable to gas such as long smoke. The virtual point xi which moves down is applicable to liquid such as falling water.

In the above embodiment, the virtual point xi is shot at time intervals. Alternatively the virtual point xi is shot at the intervals based on the moving distance of the basis portion K0.

In the above embodiment, the position of the joint L may differ from the position of the virtual point xi. However, the model setting unit 45 may change the position of the linear model K so that the joint L and the virtual point xi are located at the same position. Also, the linear model K need not have the multiple joints L in so far as the linear model K can be flexed.

The fluids T1-T3 may be shown on the polygon mesh M by executing a two-dimensional simulation of a building block (such as particle) of the fluids T1-T3.

In this case, the fluid setting unit 47 functions as the two-dimensional simulation unit and executes the two-dimensional simulation of a building block of the fluids T1-T3. And the fluid setting unit 47 displays the simulation result on the polygon mesh M. A predetermined grid (simulation grid) is set on the polygon mesh M in the two-dimensional simulation. For example, the simulation grid divides the polygon mesh M into 64×64 parts. The fluid setting unit 47 simulates a building block of the fluids T1-T3 whose starting point is a predetermined fluid source on the polygon mesh M by the grid.

The way of the two-dimensional simulation is not limited and known ways of simulation may be used. For example, the way described the following literature is used as the two-dimensional simulation.

"Real-Time Fluid Dynamics for Games", Jos Stam, <http://www.intpowertechcorp.com/GDC03.pdf>, "Fast Fluid Dynamics Simulation on the GPU", Mark J. Harris, Chapter 38. GPU Gems, <http://http.developer.nvidia.com/GPUGems/gpugems_ch38.html>

"A Simple Fluid Solver based on the FFT", Jos Stam, <http://www.dgp.toronto.edu/people/stam/reality/Research/pdf/jgt01.pdf>

"Go With The Flow: Fluid and Particle Physics in PixelJunk Shooter", Jaymin Kessler, Game Developers Conference 2010, <http://fumufumu.q-games.com/gdc2010/shooterGDC.pdf>

According to the above embodiment, an example of an action game is described; however, the present invention is applicable to various games using three-dimensional virtual space such as a role playing game, a simulation game, and a shooting game.

The above embodiment is disclosed in the form of such stationary game consoles. However, the present invention can be applied to mobile game consoles, mobile phones, personal computers, etc.

INDUSTRIAL APPLICABILITY

The present invention is applicable to a game program and a controlling method of the game, in which the game has the three-dimensional virtual space, and is prevented from increasing processing loads for showing richly the flow of the fluid on the surface of the three-dimensional objects.

REFERENCE SIGNS LIST 2 game device
30A game program
30B game data
41 virtual space generating unit
42 game screen displaying unit
43 fluid displaying unit
45 model setting unit
46 polygon mesh setting unit
47 fluid setting unit
C virtual camera
K linear model
K0 basis portion
Qi, Vi (i=1, 2, and more) track

The invention claimed is:

1. A non-transitory computer-readable storage medium storing a program for driving a computer to function as:
   a virtual space generating unit for generating a three-dimensional virtual space;
   a game screen displaying unit for displaying an image as a game screen taken by a virtual camera located in the virtual space; and
   a fluid displaying unit for displaying pseudo three-dimensional representation of fluid in virtual space on the game screen;
   wherein the fluid displaying unit includes:
   a model setting unit for setting a predetermined linear model on the virtual space and moving a basis portion of the linear model to a predetermined direction, and moving the linear model to follow virtual points which are shot from the basis portion at intervals and which move to follow a predetermined track including the basis portion as a starting point;
   a polygon mesh setting unit for setting a polygon mesh around the linear model and deforming the polygon mesh based on the movement of the linear model;
   a fluid setting unit for displaying the fluid flowing from the basis portion to an edge of the linear model on the polygon mesh.

2. The non-transitory computer-readable storage medium according to claim 1,
   wherein the fluid setting unit chooses the one fluid from the multiple fluids based on the movement of the linear model and displays the fluid.

3. The non-transitory computer-readable storage medium according to claim 1,
   wherein the linear model includes joints and at least one connecting object which connects between contiguous joints;
   wherein the model setting unit deforms the linear model to follow the virtual points by bending the joints.

4. The non-transitory computer-readable storage medium according to claim 1,
   wherein the model setting unit moves the linear model to follow the virtual points by limiting moving speeds of the joints so that the joint near the edge of two joints connected with each other is slower than the joint near the basis portion of the two joints connected with each other.

5. A method of controlling a computer comprising:
   a virtual space generating step for generating a three-dimensional virtual space;
   a game screen displaying step for displaying an image as a game screen taken by a virtual camera located in the virtual space; and
   a fluid displaying step for displaying pseudo three-dimensional representation of fluid in virtual space on the game screen;
   wherein the fluid displaying unit includes:
   a model setting step for setting a predetermined linear model on the virtual space and moving a basis portion of the linear model to a predetermined direction, and moving the linear model to follow virtual points which are shot from the basis portion at intervals and which move to follow a predetermined track including the basis portion as a starting point;
   a polygon mesh setting step for setting a polygon mesh around the linear model and deforming the polygon mesh based on the movement of the linear model;

a fluid setting step for displaying the fluid flowing from the basis portion to an edge of the linear model on the polygon mesh.

\* \* \* \* \*